Dec. 16, 1958     J. J. SCHLUMBRECHT     2,864,469
PRESSURE LOCKING UNIT FOR HYDRAULIC BRAKES
Filed June 15, 1953                              3 Sheets-Sheet 1

INVENTOR.
JOHN J. SCHLUMBRECHT.
BY
Eugene C. Knoblock.
ATTORNEY.

Dec. 16, 1958 J. J. SCHLUMBRECHT 2,864,469
PRESSURE LOCKING UNIT FOR HYDRAULIC BRAKES
Filed June 15, 1953 3 Sheets-Sheet 3

JOHN J. SCHLUMBRECHT.
INVENTOR.

BY Eugene L. Knoblock
ATTORNEY.

United States Patent Office 2,864,469
Patented Dec. 16, 1958

2,864,469

PRESSURE LOCKING UNIT FOR HYDRAULIC BRAKES

John J. Schlumbrecht, Fabius Township,
St. Joseph County, Mich.

Application June 15, 1953, Serial No. 361,519

5 Claims. (Cl. 188—152)

This invention relates to improvements in pressure locking units for hydraulic brakes. More particularly the invention relates to a device for locking or retaining hydraulic pressure in a hydraulic brake system at the wheel brakes in a manner to maintain the brakes of an automotive vehicle set or locked.

The primary object of the invention is to provide a device of this character which is interposed in the hydraulic brake operating system of a vehicle between the pedal-operated master cylinder of the system and the brake line, with its operating handle or lever located in the driver's compartment in a position convenient for manipulation by the driver of a truck or other motor vehicle.

A further object is to provide a device of this character having a novel valve construction by means of which a line between a master cylinder and a brake of a motor vehicle may be selectively opened or closed to permit selectively the normal functioning of the brake system and its release responsive to operation of the master cylinder or to permit only the application of pressure to the brake system without release thereof upon deenergizing of the master cylinder so that the vehicle brakes are held set independently of the position of the master cylinder.

A further object is to provide a device of this character adapted to lock hydraulic pressure in the wheel brakes of a vehicle and to accommodate the progressive increase of that pressure at the wheel brakes by pumping action or repeated operation of a master brake cylinder.

A further object is to provide a device of this character having a valve which is adapted to be manipulated to prevent escape of hydraulic pressure from wheel brakes and having an expansible chamber connected in communication with a master cylinder when said valve is closed so as to accept pressure generated by a pumping action of the master cylinder.

A further object is to provide a device of this character having a spring loaded check valve adapted to be manipulated to close communication from wheel brakes to a master cylinder, and having an expansion chamber thrown into communication with the master cylinder upon closing of the valve to facilitate pumping of the master cylinder without damage thereto and accommodating return of fluid pumped therein upon deenergizing of the master cylinder without releasing pressure upon the wheel brakes.

A further object is to provide a device of this character with a pressure accumulator interposed in a branch between the master cylinder and the wheel brake and which by-passes the main control valve and which branch is provided with check valves to accommodate the flow of fluid from the master cylinder therethrough and to the wheel brakes but prevent reverse flow of fluid from the wheel brakes.

A further object is to provide a device of this character having a main pressure responsive manually operated one-way valve adapted to control the flow of fluid from the master cylinder to a wheel brake, an expansible chamber adapted to receive fluid from a master cylinder when the main valve is closed, and an accumulator connected with the expansible chamber to receive fluid therefrom and to store the same, said accumulator being connected with the brake lines for flow of fluid therefrom to the wheel brakes so as to maintain uniformity of brake pressure in the wheel brakes and the accumulator when the main valve is closed.

Other objects will be apparent from the following specification.

Figure 1:
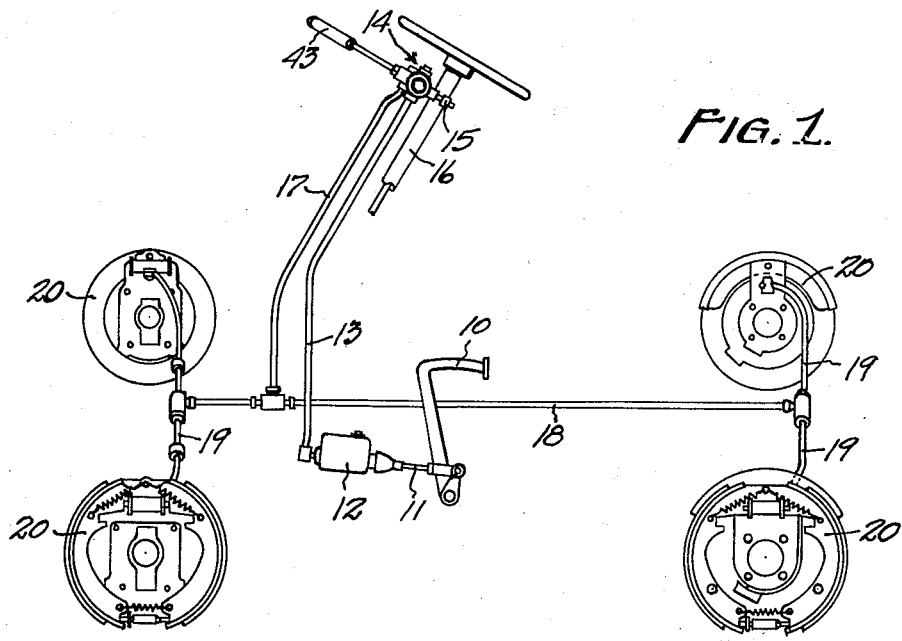
Fig. 1 is a schematic view illustrating the application of my device in a hydraulic brake system.

Referring to the drawings which illustrate the preferred embodiment of the invention, and particularly to Fig. 1, the numeral 10 designates the brake pedal of an automotive vehicle which is connected through levers and links 11 with a master cylinder 12. An outlet line 13 from the master cylinder extends to my new device 14, here illustrated as being mounted by means of a clamp 15 upon the steering post 16 of the motor vehicle. An outlet line 17 extends from the valve 14 to the main brake line 18, from which branch the individual brake lines 19 of hydraulic wheel brakes 20. All parts of this device, except my valve 14, are substantially of standard construction.

Figure 2:
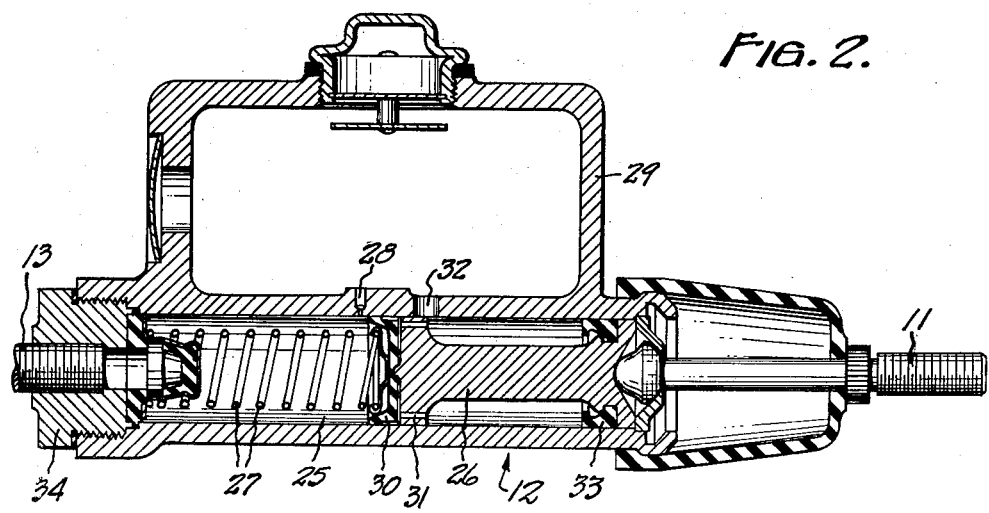
Fig. 2 is a sectional view illustrating a master cylinder of a hydraulic brake system.

For purposes of illustration and explanation, a hydraulic master cylinder is illustrated in Fig. 2, the same having a cylinder bore 25 within which a piston 26 is adapted to reciprocate under the control of link or other actuator member 11. A coil spring 27 urges the piston to an inoperative position as illustrated, at the right of a bleed port 28 which communicates with a reservoir 29. The piston will be provided with the usual cup rubber or sealing member 30 at its front end which prevents the flow of liquid therepast from the left to the right but which will permit flow of liquid through ports 31 and 32 in a direction from the right to the left as viewed in Fig. 2. A rear seal 33 on the piston serves to prevent escape of liquid from the bore 25 around the restricted portion of the piston 26 at the power-applying end thereof. A suitable fitting 34 seals the opposite end of the cylinder bore 25 and provides connection for the fluid pressure line 13 leading to my valve 14.

My improved valve mechanism has a tubular body 36 having aligned cross-tube portions 37 intermediate the ends thereof and having a bore intersecting the bore of the body 36. A shaft 38 is rotatable in the bore of the cross-tubes 37, and O-rings or other seals 39 encircle the shaft 38 at opposite ends thereof so as to prevent the passage of fluid under pressure from the tubular body 36 around the shaft 38. The shaft 38 has a cam contour 40 at the portion thereof aligned with the axis of the housing portion 36, and the shaft 38 is held against axial movement by a fitting 41 screwed into an enlargement of the bore of one cross-tube portion 37 and by a clamp 42 mounted upon the opposite end of the shaft. The clamp 42 has an elongated lever 43 projecting therefrom radially of the shaft 38. A sector 44 is fixed on the tubular projection 37 adjacent the lever 43 and has stops 45 which limit the throw of the lever 43, and also has radial grooves 46 which serve to guide the lever 43 to selected radial positions.

Figure 3:
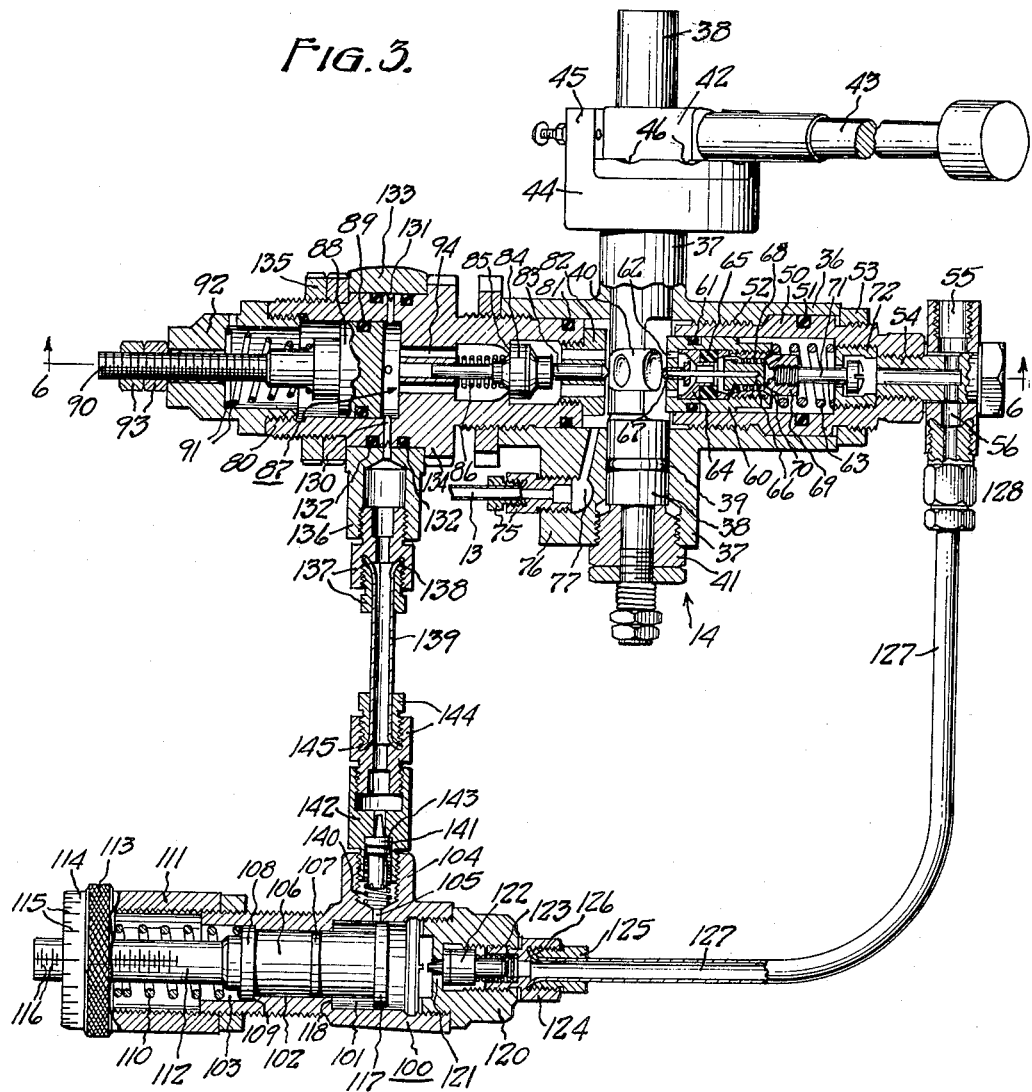
Fig. 3 is an axial sectional view of my new device taken on line 3—3 of Fig. 6 and illustrating the device in its inoperative position.

The end of the tubular body 36 illustrated at the right in Fig. 3 has a tubular member 50 mounted therein and grooved to receive an annular resilient seal member 51. The tubular member 50 is screw-threaded in body 36 at 52 and mounts a lock nut 53 at its outer end to hold it in place. One arm of a T-fitting 54 is threaded in the outer end of the member 50, the said T-fitting having an outlet 55 at which the line 17 is adapted to be connected and having another outlet 56 for purposes to be described.

A piston member 60 is slidable in the bore of the member 50, being grooved to receive an annular resilient sealing member 61 and having ports 62 at the end thereof confronting the cam 40 of the shaft 38. The piston 60 is urged into engagement with the cam 40 by coil spring 63. The piston member 60 is hollow or cup-shaped and houses an annular member 64 which serves as a means to seat an annular sealing ring 65. A valve head 66 is shiftable within the hollow piston and is adapted to seat against the sealing ring 65. The head 66 has a stem 67 which passes freely through the annular member 64 and through an aperture in the end wall of the cup-shaped piston member 60 into engagement with the cam 40 of the shaft 38. The head 66 is normally pressed toward sealing position by a coil spring 68 which abuts against a stop member 69 having liquid passages 70 therethrough and also having a shank 71 which extends into a cup-shaped spring abutment member 72 against which the coil spring 63 engages.

The line 13 is connected by means of fittings 75 with a boss 76 projecting from one of the tubular projections 37 and having a passage 77 therein which extends to the interior or bore of the tubular member 36 adjacent to the cam 40.

An expansion chamber 87 communicates with the bore of the member 36 in selected angular rotative positions of the shaft 38 as determined by the cam 40. As here illustrated this expansible chamber is axially aligned with the main valve housing above described, that is, is connected at the cylindrical member 36 at the left-hand end thereof as viewed in Fig. 3. It will be understood, however, that this arrangement is illustrative and is not intended to be limiting and that any arrangement of the parts may be employed which will provide communication of the expansion chamber 87 with the line 13 when the valve 66—65 above described has closed to prevent the flow of liquid to the line 17 connected at the fitting passage 55.

Figure 4:
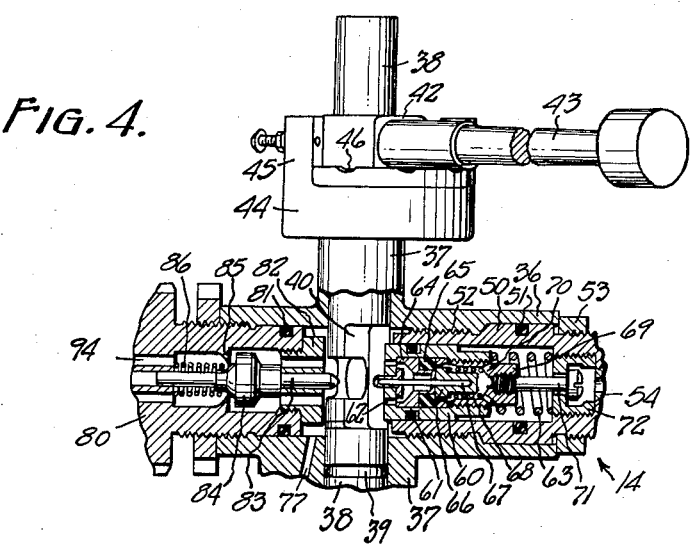
Fig. 4 is a fragmentary sectional view similar to Fig. 3 but illustrating the position of the parts in a first locked position.
Figure 5:
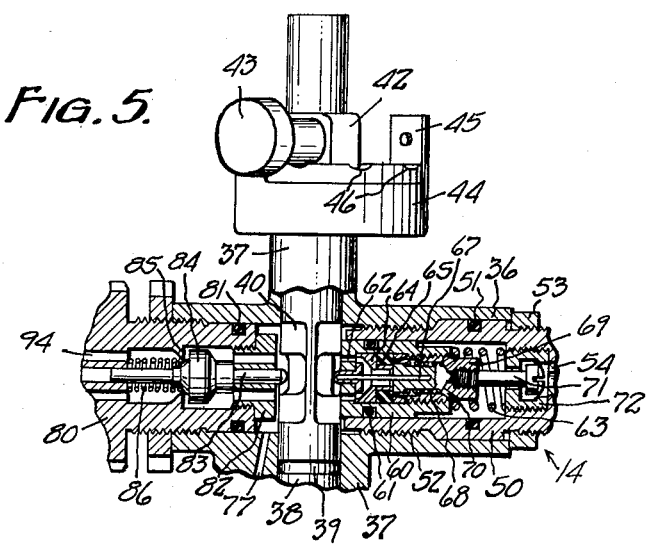
Fig. 5 is a fragmentary sectional view similar to Fig. 3 and illustrating the parts in a second locked position.

As here illustrated, the expansion chamber structure comprises a tubular member 80 which is screw-threaded in the left-hand end of the tubular member 36 and is grooved to receive an annular resilient seal at 81 to effect a sealed connection between the parts. The inner end of the member 80 carries a spider or pilot 82 which has a cylindrical passage for slidably guiding the shaft 83 of a valve member 84 which is adapted to bear against a valve seat 85 in the housing 80. The valve element 84, is positioned intermediate the length of the shaft 83, and a coil spring 86 bears against the valve 84 and normally urges it to an open position, as illustrated in Figs. 4 and 5. The member 80 has a part of its bore enlarged to slidably mount a piston 88 grooved to receive an annular resilient seal 89. Piston 88 forms one end of the expansible chamber 87 in said bore. The piston 88 has a screw-threaded stem 90 which is encircled by a coil spring 91 which abuts at one end against the piston 88 to urge it to the right as viewed in Fig. 3, and which abuts at its other end against a wall of a cup-shaped fitting 92 screw-threaded in the left-hand end of the member 80 and having a bore through which the piston stem 90 may pass with clearance. Lock nuts 93 screw-threaded on the stem 90 exteriorly of the fitting 92 serve to limit the movement of the piston 88 toward the right by the coil spring 91. Passages 94 establish communication between the part of the bore of the member 80 adjacent the valve seat 85 and the expansion chamber-defining bore 87 in which the piston 88 reciprocates.

The operation of the portion of the device hereinabove described is specifically as follows: When the device is in the position illustrated in Fig. 3, liquid under pressure from the master cylinder 12 generated by depression of the brake pedal 10 passes from the line 13 through the fitting 75 and the passage 77 into the bore of the member 36. Flow of liquid through the member 80 is prevented by the valve 84 seated at the valve seat 85. Consequently, flow in this setting of the device must occur toward the right and occurs through the bore of the member 36 around the shaft 38 and through the openings 62 in the cup-shaped piston member 60, and thence through the center of the annular guide 64 in that cup member and around the valve head 66 to the ports 70, thence through the bore of the member 50 and through the bore of the spring abutment 72 to and through the passage in the fitting 54 to its outlet 55 and the line 17. From the line 17 the liquid under pressure passes through the lines 18 and 19 to the wheel brakes 20 and causes operation thereof.

Upon release of the brake pedal 10 when the device is the position illustrated in Fig. 3, liquid flows in a reverse path, namely, from the lines 19, 18, 17 into the port 55 of the fitting 54, thence through the cup-shaped spring abutment 72 into the interior of the cylinder lining member 50, thence through the ports 70 and around the valve head 66 and through the guide ring 64 within the piston 60 and out of the piston ports 62 into the bore of the body 36. Thence liquid passes to the passage 77 and through the fitting 75 to the line 13 and back to the master cylinder 12.

Figure 6:
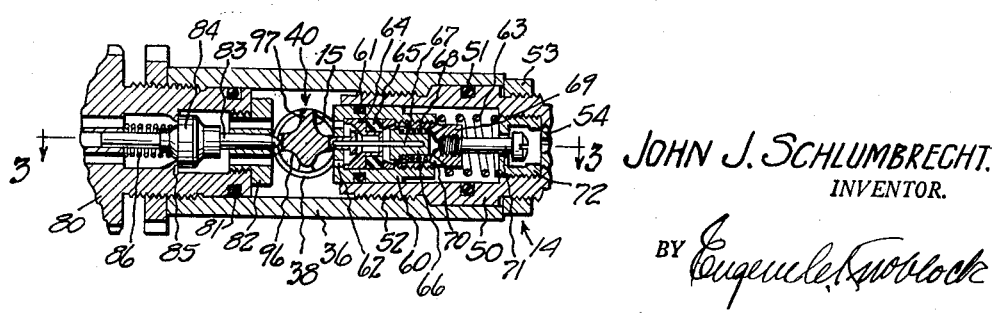
Fig. 6 is a fragmentary sectional view taken on line 6—6 of Fig. 3 and illustrating the device in the position illustrated in Fig. 1.

Assuming that the brakes have been applied while the device is in the position illustrated in Fig. 3 so that fluid pressure is applied to the brakes 20 and that the lever 43 is then swung to an intermediate position, as illustrated in Fig. 4, the fluid pressure within the brakes and the lines leading thereto will be trapped or locked, and the brakes will be held in set or braking position regardless of the subsequent manipulation of the brake pedal 10. The movement of the lever 43 to the Fig. 4 position causes rotation of the cam 40 from the position illustrated in Fig. 6 to a position in which the end portion of plunger 67 of the valve 66 seats in the hollow 96 of the cam 40. This permits the valve head 66 to move under the influence of the coil spring 68 into sealing engagement with the sealing ring 65. Consequently, flow of fluid from the wheel brakes to the master cylinder is prevented by the engagement of the member 66 with the seal 65. Therefore, as long as the lever 43 remains in the position of Fig. 4 engaging the intermediate of the positioning grooves 46, the liquid pressure in the system will be held and the brakes 20 will be operative or maintained in their set position. Thus, regardless of whether or not the brake pedal 10 is depressed or released, the brakes remain set.

The movement of the cam 40 to the Fig. 4 position brought the hollow 96 of the cam 40 into alignment with the valve stem 83, thereby permitting the spring 86 to unseat the valve 84. Consequently, if the brake pedal 10 is depressed while the lever 43 is in the Fig. 4 position, liquid under pressure which passes from the master cylinder 12 through the line 13 and enters the device through the passage 77 is permitted to flow toward the left as viewed in Fig. 4 into the member 80, past the valve 84, and into the right end part of the bore 87 defining the expansible chamber in which it acts against the piston 88 and its spring 91.

Consequently, the depression of the brake pedal 10 permits the cup 30 of the piston 26 of the master cylinder to pass the bleed port 28 while liquid is being displaced into the expansible chamber 87 ahead of the piston 88. In this way all danger that operation of the brake pedal 10 while the lever 43 is in the Fig. 4 position will damage the cup 30 of the master cylinder, is avoided. Stated differently, the transmission of liquid under pressure from the master cylinder into the expansible chamber 87 occurs with only substantially normal back pressure so that danger of extrusion of the flange of cup 30 into the bleed opening 28 as it moves past the same with resultant nibbling, cutting or destruction of the cup flange, is wholly avoided. It will be apparent, furthermore, that upon release of foot pedal pressure, the piston 88 of the expansible chamber 87 is permitted to return to its normal position under the pressure of the coil spring 91, thereby permitting return of liquid under pressure from that expansible chamber to the master cylinder.

The cam 40 is so shaped that it has a rib or raised part 97 which is engageable with the piston 60 when the lever 43 is moved to the position illustrated in Fig. 5. This action preferably occurs before part 97 is turned enough to engage plunger 67 and hence at a position where the plunger 67 remains in the hollow 95 of the cam. Consequently, an even firmer abutment of the valve parts 65 and 66 results when the parts are in the position illustrated in Fig. 5. At the same time the hollow part 96 of the cam which is engaged by the valve plunger 83 permits that plunger to remain in open valve position. The result of this arrangement, therefore, is that the Fig. 5 position locks the main valve shut firmly at 65, 66 and maintains open the valve head 84 in the passage leading to the expansible chamber 87. Consequently, the same hydraulic holding power is retained at the brakes, as mentioned previously, and the advantages of the expansion chamber 87 are retained, in the Fig. 5 setting as well as in the Fig. 4 setting. It will be noted further that in each of the Figs. 4 and 5 settings the expansibility of the chamber 87 may be regulated by adjusting the lock nuts 93 upon the stem 90 of the piston 88.

The device may be provided with an accumulator for storing liquid under pressure incident to pumping of the brake-actuating pedal 10 after the device has ben set in either of the pressure-retaining positions of Figs. 4 and 5. This accumulator may constitute a separate member or may be connected with the other parts of the device in any manner found suitable. It has been illustrated in Fig. 3, for purposes of convenience, as a mechanically separate member.

The accumulator has a body portion 100 provided with a large diameter cylindrical bore 101 adjacent one end, an intermediate reduced cylindrical bore portion 102, and an end cylindrical bore portion 103. The body 100 is generally tubular in character and has a projecting boss 104 provided with a bore open into communication with the bore portion 101 at the port 105. A piston 106 fits snugly in the bore portion 102 and is grooved to receive an annular resilient seal 107, such as an O-ring, intermediate its ends and fitting in the bore portion 102.

An annular flang 108 is formed on the piston and is slidable freely in the bore portion 103 and is normally pressed against the shoulder 109 between the bore portions 102 and 103 by a coil spring 110. The coil spring is housed in a tubular casing portion 111 screw-threaded upon the end of the body 100. The coil spring 110 encircles a stem 112 projecting endwise from the piston 106 and terminates outwardly of the end of the accumulator. A screw-threaded cap 113 has screw-thread connection with the tubular part 111 and has a hub 114 which is provided with a plurality of micrometer markings 115 which are read in conjunction with micrometer markings 116 on the projecting end of the stem 112. These micrometer markings may be calibrated in terms of pressure. The micrometer adjustment accommodates regulation of the pressure applied by the spring 110 to resist movement of the piston 106 toward the left as viewed in Fig. 3, it being understood that the cap 113 has a bore slidably receiving the piston stem 112. The piston 106 preferably has an annular flange 117 at its right-hand end having a loose fit in the bore portion 101 and adapted to engage the shoulder 118 between the bore portions 101 and 102 for the purpose of limiting pressure responsive movement of the piston 106 toward the left.

As viewed in Fig. 3, the right-hand end of the accumulator housing 100 is internally screw-threaded and receives a tubular fitting 120 having a web portion 121 at its inner end which is interrupted by a restricted opening and which constitutes a seat for a valve member 122 slidable in the fitting under the influence of a coil spring 123. The spring 123 is retained by the inner cup-shaped end portion of a fitting 124 which is screw-threaded in the fitting 120. The fitting 124 in turn receives a coupling member 125 adapted to anchor and seal the flared end portion 126 of a conduit 127. This conduit extends to and is connected by means of a fitting 128 to the fitting 54 at the port 56. Thus, the communication of the bore portion 101 with the line 127 is controlled by the check valve 122, and in turn the line 127 is connected by fittings 128 and 54 with the line 17 leading to the brakes. The check valve 122 is adapted to open in response to pressure within the accumulator bore 101 for flow of liquid under pressure from the accumulator 100 to lines 127 and 17 and serves to prevent reverse flow, that is, to prevent flow from conduit 127 to the chamber 101.

Means are provided for connecting the portion of the expansible chamber 87 forwardly i. e., at the right of the piston 88 as seen in Fig. 3 with the bore portion 101 of the accumulator. In the form illustrated, the member 80 is provided with a plurality of passages 130 which extend to the periphery of the member 80, said passages 130 being located at the receiving end of the expansible chamber 87, that is, adjacent the outlets of the passages 94. The member 80 has an external peripheral groove 131 formed therein and registering with the outlets of the passages 130. Annular resilient sealing members or O-rings 132 are seated in grooves in the body member 80 at opposite sides of the passages 130. A ring member 133 encircles the portion of the member 80 which is provided with the groove 131 and which mounts the sealing members 132, said ring member 133 preferably bearing against a shoulder flange 134 intermediate the length of the member 80 and being locked in place by lock nuts 135 which are screw-threaded upon the tubular body portion 80. The ring 133 has a projecting stud 136 provided with a bore which communicates with the inner periphery of the ring 133 in register with the groove 131. Fitting members 137 are carried by the boss 136 and cooperate to anchor the flared end portion 138 of a conduit 139.

The bore of the boss 104 of the accumulator 100 is of larger diameter at its free end than at its inner end and thus is provided with a shoulder against which a coil spring 140 abuts. This coil spring in turn bears against a valve member 141 which is shiftable in the bore of a fitting 142 having a part threaded in the bore of boss 104. Fitting 142 has a valve seat 143 against which the valve 141 is normally pressed by the spring 140. Fitting members 144 are mounted on the fitting 142 and cooperate to sealingly anchor the flared end 145 of the conduit 139. It will be observed that the member 141 constitutes a check valve which permits the flow of fluid under pressure from the conduit 139 into the accumulator 100 but which prevents reverse flow of fluid.

From the foregoing it will be observed that the accumulator constitutes a storage chamber usable when the device has been adjusted to either of the Fig. 4 or Fig. 5 positions to lock or retain fluid in the brakes against reverse flow to the master cylinder. Thus assuming that the lever 43 is set in the position illustrated in either Fig. 4 or Fig. 5, any pumping action of the brake pedal will cause liquid under pressure to be supplied to the expansible chamber 87 and also to the accumulator. The liquid which passes the check valve 141 to enter the accumulator cannot flow back into conduit 139. The liquid in the line 139 and within the expansible chamber 87, however, is not trapped and is free to flow back to the master cylinder upon release of the brake pedal. Therefore, it will be apparent that by repeated pumping operation of the brake pedal, it is possible to build up in the accumulator 100 a charge of liquid under pressure. When the charge of pressure built up in the accumulator exceeds the pressure which exists in the brake line and the force of spring 123 acting on check valve 122, equalization of pressure between the accumulator and the brake system will occur as a result of the unseating of the check valve 122 in response to the excess of pressure in the accumulator as compared to the pressure within the line 127 and the brake lines and brakes of the vehicle. Thus it is possible, while the vehicle stands with brakes 20 actuated and lever 43 in either the Fig. 4 or the Fig. 5 position, to increase the pressure applied to the brakes without operating the lever 43 or in any way releasing the pressure upon the brakes. This gives an increased safety factor which is particularly desirable in hot weather.

The safety factor mentioned above is achieved by the device as follows: Assume that the vehicle is stopped with the brakes set and that a pressure of 300 pounds exists in the brake line and in the accumulator during daylight hours on a hot day when the temperature is sufficiently high to have some influence upon the fluid pressure exerted upon the brakes, then, if the vehicle stands over night and experiences a substantial drop in temperature, that temperature drop may result in a substantial drop in the fluid pressure trapped in the system, especially within the lines 17, 18 and 19 which have a small bore and a large surface area. This will result in a substantial reduction of the pressure existing in the brake system, thereby tending to relax the holding action of the brakes. The accumulator chamber, being of comparatively larger volume and smaller surface area, suffers a lesser reduction of pressure due to temperature change than that occurring in the lines 17, 18, 19 and in the brakes 20. As this difference in pressure between the accumulator 100, on the one hand, and the brake lines and brakes occurs as a result of a temperature drop, the check valve 122 is unseated and the pressure differential is reduced, with the result that pressure equalization occurs between the accumulator and the brakes which is effective to avoid dangerous reductions of pressure at the brakes due to temperature differences.

The pressure built up within the accumulator is dissipated as soon as direct communication between the brakes and the master cylinder is reestablished. Thus, when the main valve is opened by manipulating the lever 43 to the Fig. 3 setting, all of the pressure which has been accumulated in the accumulator bleeds therefrom. The device, of course, is reestablished for subsequent accumulating action on the next resetting of the valve lever 43 to Fig. 4 or Fig. 5 position.

While the device has been illustrated herein as one in which the expansible chamber 87 is interposed between the accumulator 100 and the master cylinder, this arrangement is not required and the expansible chamber 87 may be omitted completely. In such a construction the expansible chamber of the accumulator will serve substantially the same purpose as the expansible chamber 87 here illustrated. It is preferred, however, to employ the expansible chamber 87 in addition to the accumulator as it has been found that this produces slightly superior results, particularly by reason of the fact that the pressure of spring 91 of the expansible chamber 87 may be less than that desired at spring 110 in the accumulator.

While the device herein illustrated uses annular resilient sealing members, such as O rings formed of rubber or synthetic rubber for sealing purposes, as at the parts 39, 51, 61, 81, 89, 107 and 132, it will be understood that seals of this character are not essential and that, where used, they will conform with standard practices in the use of O-rings for effecting a seal between interfitting parts.

One of the advantages of this device not previously mentioned is the fact that movement of the device from the position shown in Fig. 4 to the position shown in Fig. 5 results in an increase of the operating pressure exerted at the wheel brakes. This pressure increase results from bodily movement of the piston member 60 by the cam rib 97 in a manner to reduce the volume of liquid which may be contained within the member 50 and thus causes displacement of liquid from the member 50 into the wheel brakes with resultant increase in pressure. Thus assuming that the brakes are applied while the device is in the position shown in Fig. 3 and that, while the brake pedal is held applied, the lever 43 is moved to the position shown in Fig. 4, the pedal-applied pressure is retained at the wheel brakes. Thereupon an increase in pressure exerted at the wheel brakes can be obtained by swinging the lever 43 from the Fig. 4 to the Fig. 5 position. Thereafter, if a further pressure increase is desired, pumping action of the pedal is utilized, which pressure either passes through valves 65, 66 or is by-passed through the by-pass lines 139 and 127 to the wheel brakes, the same being retained against release by the check valves 122 and 141 until such time as the lever 43 is returned to the Fig. 3 position to release the applied pressure acting upon the wheel brakes.

While the construction herein illustrated and described is preferred, it will be understood that changes in the construction may be made within the scope of the appended claims without departing from the spirit of the invention.

I claim:

1. In combination, a hydraulic brake system including a master cylinder having a piston and a filling port near the beginning of the stroke of the piston, hydraulic brakes and a conduit line connecting said cylinder and said brakes, a normally open valve interposed in said line, said valve retaining braking pressure in said brakes when closed, an expansible chamber inlet means communicating with said line between said cylinder and said valve, a normally closed valve in said inlet for controlling pressure in said chamber, and an actuator for simultaneously actuating both valves in opposite senses, said expansible chamber receiving fluid during initial movement of said piston past said filling port when said first valve is closed and said second valve is open.

2. In combination, a hydraulic brake system including a master cylinder, hydraulic wheel brakes and a conduit line connecting said cylinder and said brake, said master cylinder having a piston and a filling port near the beginning of the stroke of the piston, a chambered housing having an inlet and an outlet for connection with said line, a normally open valve in said housing interposed between said inlet and outlet and having a spring pressed part, a pressure responsive piston shiftable in a portion of said housing communicating with said inlet and separated from said outlet by said valve, a second normally closed valve in said housing interposed between said inlet and said piston, and means carried by said housing for simultaneously operating said valves in opposite senses, said pressure responsive piston accommodating fluid pressure generated in said system by initial movement of said master cylinder piston past said filling port when said first valve is closed.

3. In combination, a hydraulic brake system including a master cylinder, hydraulic wheel brakes and a conduit line connecting said cylinder and said brake, said master cylinder having a piston and a filling port near the beginning of the stroke of the piston, a chambered housing having an inlet and an outlet for connection with said line, a spring pressed valve in said housing interposed between said inlet and outlet, a pressure responsive piston shiftable in a portion of said housing communicating with said inlet only, a second valve in said housing interposed between said inlet and said piston, and means journaled in said housing for operating both valves in opposite senses, and including cams engaging said valves and a common actuator for said cams, said pressure responsive piston yielding to the pressure generated by initial movement of said master cylinder piston past said port when said second valve is open.

4. In combination, a hydraulic brake system including a master cylinder, hydraulic brakes and a conduit line connecting said cylinder and said brakes, said master cylinder having a piston and a filling port near the beginning of the stroke of said piston, a normally open valve interposed in said line and adapted to be closed to retain braking pressure in said brakes, by-pass means connected to said line in parallel relation to said valve to direct flow from said cylinder to said brakes, a check valve in said by-pass means for preventing flow from said brakes to said master cylinder, an accumulator interposed in said by-pass means for transmitting fluid pressure to said brakes, and an expansible chamber interposed in said by-pass means and including a spring pressed piston shifting in response to initial movement of said master cylinder piston past said port when said first valve is closed.

5. In combination, a hydraulic brake system including a master cylinder, hydraulic brakes and a conduit line connecting said cylinder and said brakes, said master cylinder having a piston and a filling port near the beginning of the stroke of said piston, a normally open valve interposed in said line and adapted to be closed to retain braking pressure in said brakes, by-pass means connected to said line in parallel relation to said valve to direct flow from said cylinder to said brakes, a check valve in said by-pass means for preventing flow from said brakes to said master cylinder, an accumulator interposed in said by-pass means for transmitting fluid pressure to said brakes, an expansible chamber interposed in said by-pass means, a third normally closed valve controlling flow from said master cylinder to said by-pass, and an actuator for simultaneously operating said first named and third valves in opposite senses, said expansible chamber accommodating initial operation of said master cylinder piston past said port when said first valve is closed and said third valve is open.

References Cited in the file of this patent

UNITED STATES PATENTS

| | | |
|---|---|---|
| 1,965,459 | Fischer | July 3, 1934 |
| 1,991,603 | Dick | Feb. 19, 1935 |
| 2,084,416 | Tatter | June 22, 1937 |
| 2,148,268 | Kerr | Feb. 21, 1939 |
| 2,301,037 | Greene | Nov. 3, 1942 |
| 2,307,644 | Schlumbrecht et al. | Jan. 5, 1943 |
| 2,322,062 | Schnell | June 15, 1943 |
| 2,366,173 | Boldt | Jan. 2, 1945 |
| 2,445,855 | Majneri | July 27, 1948 |
| 2,466,224 | Frank et al. | Apr. 5, 1949 |
| 2,466,837 | Bohr | Apr. 12, 1949 |
| 2,502,118 | Ashton et al. | Mar. 28, 1950 |
| 2,572,190 | Patrick | Oct. 23, 1951 |
| 2,601,909 | Seppmann | July 1, 1952 |
| 2,633,711 | Torrence | Apr. 7, 1953 |
| 2,727,599 | Melfi | Dec. 20, 1955 |